UNITED STATES PATENT OFFICE.

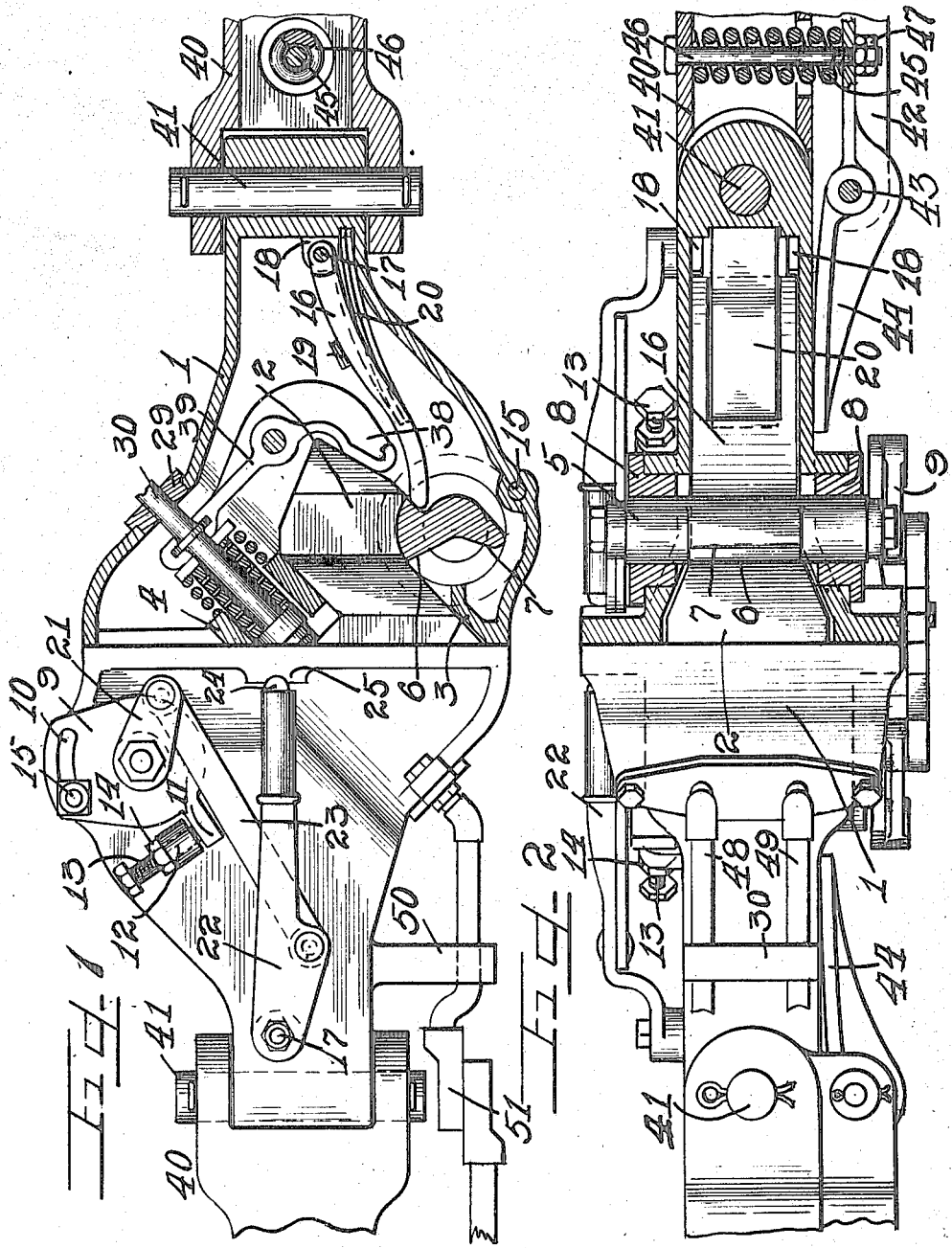

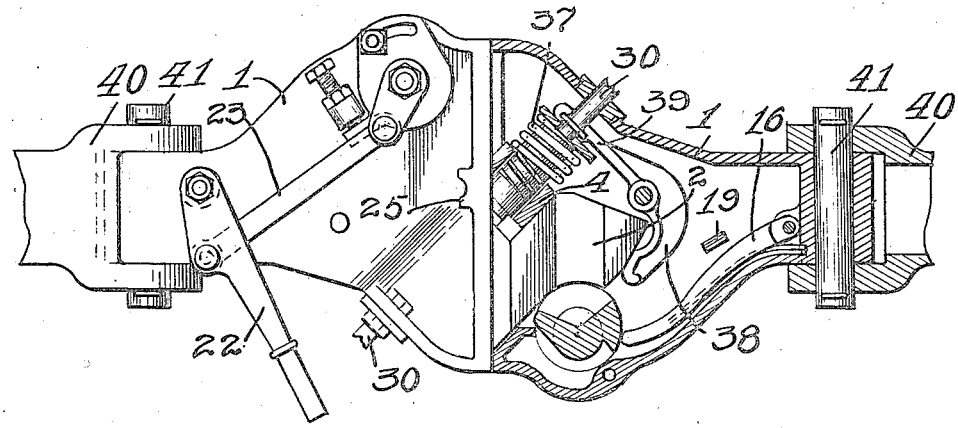
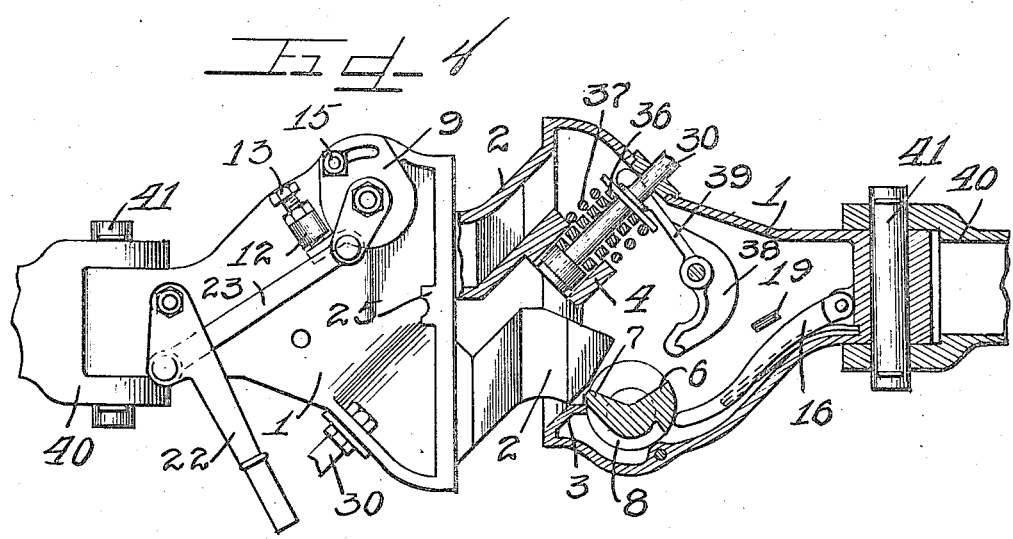

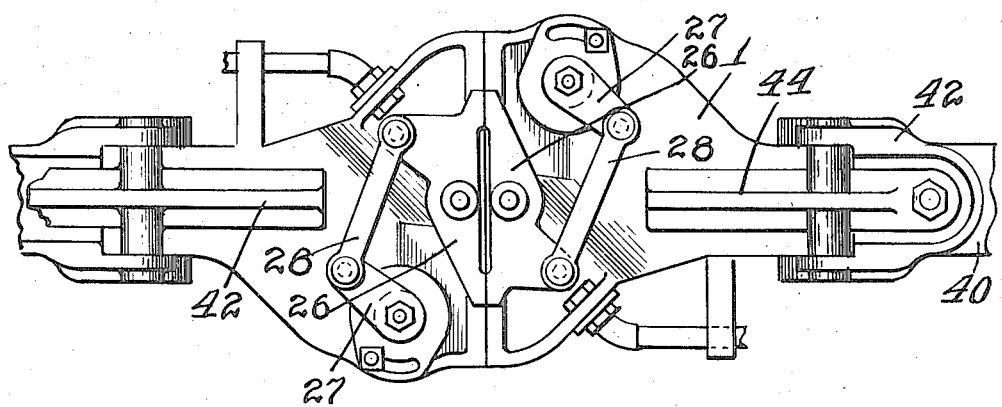
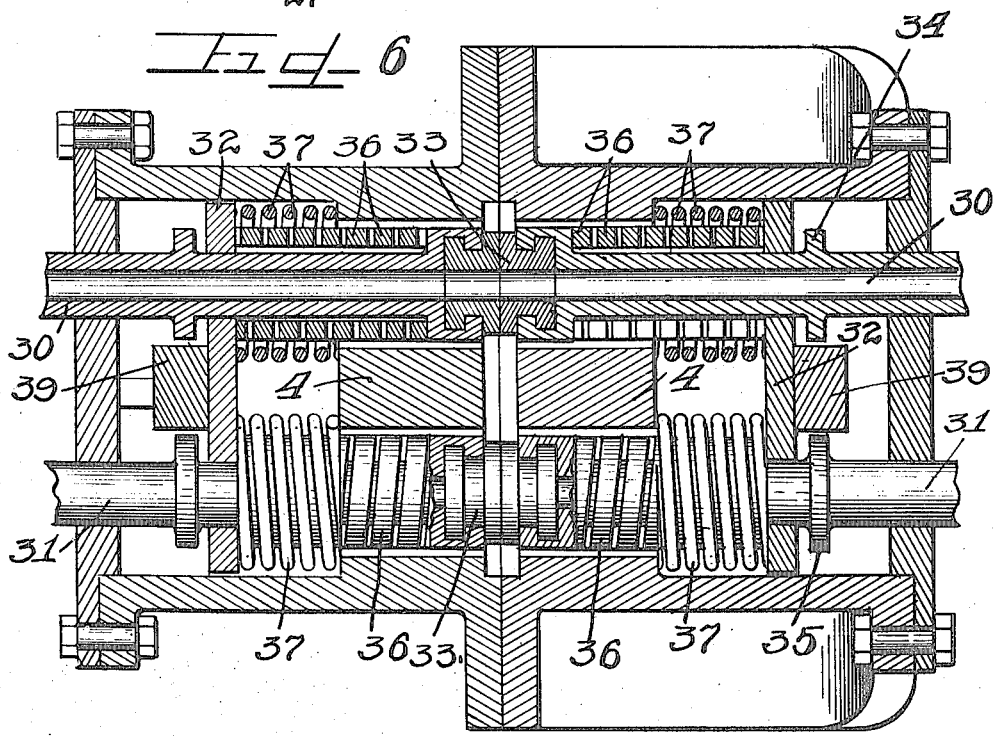

HERBERT E. VAN DORN, OF CHICAGO, ILLINOIS, ASSIGNOR TO VAN DORN COUPLER COMPANY, OF CHICAGO, ILLINOIS, A CORPORATION OF ILLINOIS.

CAR-COUPLING.

1,161,426.   Specification of Letters Patent.   Patented Nov. 23, 1915.

Application filed October 27, 1913. Serial No. 797,448.

*To all whom it may concern:*

Be it known that I, HERBERT E. VAN DORN, a citizen of the United States, and a resident of the city of Chicago, in the county of Cook and State of Illinois, have invented certain new and useful Improvements in Car-Couplers; and I do hereby declare that the following is a full, clear, and exact description of the same, reference being had to the accompanying drawings, and to the numerals of reference marked thereon, which form a part of this specification.

This invention relates to a car coupler in which the steam and air lines of the train are efficiently and securely coupled to one another through the drawheads of the cars.

Many attempts have been made to construct a car coupling having associated therewith means for connecting the steam and air lines of a train simultaneously with the coupling of the cars. It is a well known fact, however, if any relative movement is permitted between the drawheads such movement will cause a leakage of the steam or air at the connection of the respective pipes in the drawhead, thereby making the connection ineffective as well as a source of danger.

Attempts have been made to lock the drawheads securely together, in order to prevent the relative movement therebetween, but such devices, although operating fairly well when first installed, soon become loose and ineffective because of the wear imposed thereupon and the device becomes practically useless.

By my invention I purpose using spring impelled pipe line connections in each of the respective drawheads adapted to abut with a corresponding pipe line connection of another drawhead, and under the impulse of the respective springs in said drawheads to sealingly engage one another, affording a tight joint between the respective pipe line connections.

I also purpose using means for securely locking the drawheads together to prevent relative movement therebetween, as well as means for taking up the wear, whereby adjustments may be made at any time to take up any looseness occurring therebetween when the drawheads are coupled.

It is an object of this invention to provide a device wherein the respective steam and air lines may be projected into engagement with one another simultaneously with the coupling of the cars, and automatically retracted within the drawheads when the same are uncoupled.

It is also an object of this invention to provide a device wherein coupling of the drawheads positively impels the respective pipe line connections into engagement with one another.

It is also an object of this invention to provide a device which acts automatically to lock the drawheads in coupled relation, only to be released therefrom by manual means.

It is also an object of this invention to provide a device capable of movement about a horizontal pivot to insure a uniform contact of the drawhead faces, and adjustable spring impelled means for normally maintaining said device in a predetermined position about said pivot point.

It is also an object of this invention to provide a device equipped with slidably mounted spring impelled pipe line connections and means for normally retracting the same within the face of the drawhead when the drawhead is in uncoupled position.

It is also an object of this invention to provide an eccentrically mounted adjustable locking member, thus insuring a tight coupling between the drawheads at all times.

It is also an object of this invention to provide a drawhead having a locking link or knuckle integrally connected thereto, and with rotatable cam blocks in the respective drawheads acting automatically to interlock with a complemental coupling knuckle when said knuckle is inserted within the drawhead.

It is also an object of this invention to provide a device equipped with interlocking cam blocks eccentrically and rotatably mounted in adjustable bushings, and means for locking said bushings in adjusted position.

It is also an object of this invention to provide in a device a rotatable cam block actuatable by a spring impelled member and eccentrically mounted in a rotatable bushing for adjustment.

It is also an object of this invention to provide eccentrically mounted recessed rotatable cam blocks together with a spring actuated pawl bar and suitable levers connected to said cam block for manual actuation thereof.

It is also an object of this invention to provide in combination with the locking means of a drawhead spring impelled pipe line connections actuatable by one of the complemental interlocking members of a drawhead and means for automatically retracting said pipe line connections within the drawhead with the uncoupling of the same.

It is also an object of this invention to provide a cam locking block eccentrically mounted in bushings in a drawhead, means for adjusting said bushings to take up for wear on the cam block, and means for locking said bushings in adjusted position.

It is also an object of this invention to provide in combination with positively actuated, spring impelled pipe line connections in a drawhead, angled coupling knuckles adapted to coact with a rotatable cam block, and a pivotally mounted spring impelled pawl bar together with actuating levers connected to said cam block for manually operating the same in uncoupling the device.

It is furthermore an object of this invention to provide separating mechanism for the drawheads acting to guide the same during coupling or uncoupling thereof.

It is finally an object of this invention to provide a device consisting of few parts and acting positively to interlock a pair of drawheads rigidly together affording practically a unitary construction, thus obviating any wear or leakage upon the pipe line connections extending therethrough.

The invention (in a preferred form) is illustrated in the drawings, and hereinafter more fully described.

In the drawings: Figure 1 is a top plan view partly in section of the drawheads coupled together in locking relation. Fig. 2 is a side elevation thereof partly in section, showing the drawheads coupled. Fig. 3 is a top plan view partly in section showing the drawheads in coupled relation and with the locking mechanism actuated to release position by the levers for the purpose. Fig. 4 is a similar view illustrating the levers positioned in release position and with the drawheads approaching toward one another. Fig. 5 is a bottom plan view of the drawheads shown in coupled relation. Fig. 6 is a section taken on line 6—6 of Fig. 1.

As shown in the drawings the reference numeral 1, indicates the drawhead of a coupler which has formed integral therewith a locking link or knuckle 2, being pointed at its ends and angled throughout its length for the purpose of permitting an interlocking of the same in a suitable similarly angled recess in another drawhead. The drawhead is formed with a flat vertical transverse abutting face which is inclined inwardly near one edge affording a shoulder 3, which forms one side of an aperture in the face of the drawhead for the reception of a complemental interlocking knuckle therein.

Formed integral with the locking knuckle at the inner side thereof and angled inwardly of the face of the drawhead is an apertured partition 4. Said partition 4 affords one of the side walls of the aperture in the drawhead and has an inner inclined face parallel to said inwardly directed shoulder 3, of the drawhead thus affording an abutting face co-acting with the locking means to retain a knuckle or locking link within the drawhead. The outer face of said inwardly directed partition 4, affords the abutting face through which the respective pipe lines hereinafter described connect with one another when the drawheads are coupled.

For the purpose of locking a complemental knuckle within the drawhead a locking cam block is provided comprising gudgeons 5, and a recessed portion intermediate the same consisting of a sector locking element 6, and a tail piece 7, all of which portions are associated in an integral construction. The gudgeons 5, of said cam block are eccentrically journaled in similarly constructed and similarly disposed bushings 8, which are rotatably mounted in alined apertures in the top and bottom wall of the drawheads respectively. The purpose of mounting the cam block eccentrically in the bushings 8, is to provide a means whereby the axis of said cam block may be adjusted to various positions within the drawhead to take up for wear upon the cam block. In order to permit proper adjustment of said bushings 8, a slotted plate 9, having an arc shaped slot 10, therein, is provided on said bushings at the top and bottom of the drawhead, and a projecting tongue 11, formed integral with said plate 9, projects outwardly therefrom along one edge thereof.

An apertured lug 12, is provided on the upper and lower surfaces of the drawhead and threaded therein is an adjusting bolt or screw 13, having a locking nut 14, thereon. A locking bolt 15, passes through the upper and lower rails of the drawhead, and projects through the slots 10, in the respective adjusting plates 9, thus providing a means of locking said plates 9, in any position desired. A pawl bar 16, is rigidly mounted upon a pivot shaft 17, suitably journaled in lugs 18, within and at the rear of the drawhead, and said pawl bar is normally impelled toward a lug 19, which serves to limit the movement thereof, by a leaf spring 20. The outer extremity of said pawl bar 16, serves to engage behind the sector portion 6, of the locking cam block when said block has been moved a slight amount from release position and then acts to normally project said cam block into locking position.

For the purpose of rotating the cam block into unlocking position to permit withdrawal of the knuckle 9, from the drawhead a crank 21, is rigidly secured to the upper reduced end of the cam block and is suitably linked to an actuating lever or handle 22, which is pivotally mounted on the upper wall of the drawhead, by means of a link 23, so that movement of the cam block is effected by movement of the handle.

As illustrated in Fig. 1, the drawheads are shown coupled together and with the locking cam blocks in locking position, the same being retained from accidental rearward movement into releasing position by the spring impelled pawl bars 16.

Any tendency for the knuckle 2, to rotate the cam block forwardly by pulling upon the same due to its engagement therewith is prevented due to the angularity of the knuckle, and the walls of the recess in the receiving drawhead, so that an outward movement of the knuckle from the drawhead would cause the same to be wedged between the sector portion of the cam block and the inner inclined wall of said partition 4, on the opposite side of said recess. The locking position of the lever 22, is in alinement with the axis of the drawhead, said lever being held in such position by a spring pressed detent 24, provided in the end of said lever, adapted to engage in a recessed projection formed inwardly on the upper flange of the outer surface of the drawhead.

In order to insure unlocking of each of the drawheads when one of the cam blocks is rotated into release position, pivoted shoes 26, are mounted on the under surface of the drawhead with the extended bearing portions thereof normally in the plane of the abutting faces of the drawheads. As shown in Fig. 5, when two similar drawheads are coupled together said shoes 26, bear against one another. A crank 27, is rigidly connected to the lower reduced end of the cam block, and is pivotally connected to an extended portion of said shoe 26, by means of a connecting link 28, so that when the cam block is moved into release position the bearing shoe will be moved about its respective pivot, thus moving the other shoe about its pivot to rotate the other cam block into release position, the shoes serving, by their engagement with one another in such angled position, to guide the drawheads apart as they recede from one another.

Threaded into the outer side walls of the drawhead are apertured bushings 29, which slidably receive the pipe lines 30, and 31, respectively therethrough. Said pipe lines project through apertures in a sliding block 32, and at their outer ends are enlarged to receive gaskets 33, therein, adapted to afford a sealing connection between the abutting pipe lines when the drawheads are in coupled relation. Each of the pipe lines 30, and 31, is provided with the respective flanges 34, and 35, adapted to be contacted by the block 32, when the same moves rearwardly, to thereby retract the pipe lines within the drawhead. A spiral spring 36, is wound about each of said pipe lines and bears at one of its ends against the enlarged extremity of the pipe line, and at its other against said block 32, thereby normally impelling the pipe line connection outwardly through the face of the drawhead partition 4, thus affording a resilient contact between the abutting ends of the respective pipe line connections when the drawheads are coupled. A spiral spring 37, bears against a shoulder on said partition 4, and at its other end against said block 32, thus normally impelling said block rearwardly, which, upon engaging the respective flanges 34, and 35, on the pipe lines, serves to retract the pipe line connections within the drawhead. Mechanism is provided for positively moving said slidable blocks 32, forwardly to project the respective pipe line connections into abutment with one another, when a locking link or knuckle of the coupler is projected into the drawhead. This mechanism comprises a pivotally mounted bell crank, one arm 38, of which normally projects into the path of the knuckle 2, as it enters the drawhead, and the other arm 39, of which bears against the sliding block 32, between the respective pipe line connections 30, and 31, so that as the arm 38, of said crank is thrust rearwardly, due to the projection of the knuckle 2, within the drawhead, the arm 39, of said crank thrusts the slidable block 32, forwardly, thus projecting the respective pipe line connections into engagement with one another at the abutting faces of the partitions 4, of the drawheads.

In order to facilitate coupling and to insure the coupled drawheads remaining positively locked to one another with relative movement of the cars, the drawhead is horizontally pivoted to a drawbar 40, by means of a pin 41. Said drawbar 40, is hollow and is provided with downwardly extending lugs 42, adapted to receive therethrough a pivot pin 43, upon which is mounted a supporting lever 44, which engages beneath the under flat surface of the drawhead, and is impelled into such position to support the drawhead thereon by a spiral compression spring 45, which is wound about a bolt 46, extending vertically through the drawbar and loosely through said lever with the spring bearing at one of its ends against the upper surface of the under portion of the drawbar, and at its other end against the upper surface of one arm of said lever. The nuts 47, on said bolt 46 affords a means for adjusting the position of the lever and the compression force of the spring 45. The respective pipe lines 30, and 31, are connected to flexible pipe sections 48, and 49, respectively, which are supported near their ends in a bracket 50, formed on one of the outer side walls of the drawhead, and any suitable pivot pipe coupling 51, is provided to connect said flexible portions to the main pipe lines of the car.

The operation is as follows: The coupler as shown in Fig. 4, is in a position prior to coupling of the drawheads and the cam block is shown in released position with the tail 7, thereof projecting a slight amount beyond the shoulder 3, of the recessed wall. As the knuckle 2, enters the drawhead, it strikes the tail 7, of said cam block, thereby rotating the same in a counter-clockwise direction, moving the sector portion of said cam block an amount sufficient to permit the pawl bar 16, to engage therebehind, which under the impulse of its spring, continues the counter-clockwise rotation of the cam block, and, as the sector portion thereof strikes the knuckle it bears on the surface thereof until the knuckle is entirely within the drawhead and the drawhead faces are in close contact, whereupon the cam block rotates still further under the impulse of the spring impelled pawl bar, with the sector portion 6, against the curved arc-shaped wall of the knuckle to lock same firmly within the drawhead.

The purpose of the handle 22, is merely to retract the cam block in a clockwise direction into unlocking position and said handle is mounted at the rear of the drawhead in order that a long handle arm may be used with sufficient clearance to avoid inconvenience to an operator. As the knuckle enters within the drawhead it strikes the arm 38, of the bell crank, thereby gradually projecting the pipe line connections forwardly through the inclined abutting surface of the partition 4, so that as the drawheads become closely and tightly connected the respective pipe line connections will be projected into abutment, securely and in positive alinement with one another, the interposition of the spiral spring, of course, serving to make the connection between abutting lines of a flexible nature.

When it is desired to uncouple the drawheads, the operator moves the handle 22, into the position disclosed in Figs. 3, and 4, whereupon the pivoted shoes 27, on the under surface of the drawhead will serve to effect an uncoupling of the drawheads and as the knuckle 2, recedes from its recess in the drawhead, pressure upon the arm 38, being released, the arm 39, of said bell crank will be permitted to move rearwardly, the slidable block 32, bearing against the respective flanges 34, and 35, acting to retract the pipe lines within the drawhead.

It is highly desirable in a device of this nature that the drawheads fit closely to one another practically as a unitary structure in order that no relative movement therebetween may be transmitted to the pipe line connections afforded within the drawhead, which would soon produce wear and leakage at the joints. Consequently it becomes necessary that adjustment for wear upon the locking cam blocks be introduced into the mechanism so that the knuckles may always be tightly engaged within the respective drawheads. For this purpose the locking cam blocks are rotatably and eccentrically mounted in rotatable bushings, and adjusting means are connected with each of said bushings, whereby the same may be rotated, the eccentricity of the cam block therein serving to cause movement of the cam block to or from the position of an engaged locking link or knuckle to take up for wear. This adjustment is effected by loosening the bolts 15, engaged in the slots of the plates 9, which are rigidly connected to each of said bushings, as well as loosening the lock nut 14, upon the adjusting bolt 13, whereupon said bolt 13, may be adjusted until the bushings have been rotated an amount sufficient to project the axis of the locking cam block toward the position of an engaged knuckle to take up for wear. Of course, after such adjustments have been made the locking bolts 14, and 15, are tightened to retain said bushings in adjusted position. The spring impelled lever 44, serves to maintain the drawheads in the proper position and yet permit a certain amount of pivotal movement about the pin 41, so that the drawheads may accommodate themselves to one another to insure a tight and uniform fit between the abutting faces thereof.

I am aware that various details of construction may be varied through a wide range without departing from the principles of this invention. I therefore do not purpose limiting the patent granted otherwise than necessitated by the prior art.

I claim as my invention:

1. In a device of the class described a drawhead, a locking knuckle integral therewith, adjustable bushings in said drawhead, and a locking cam block eccentrically mounted in said bushings affording adjustment for said cam blocks to take up for wear.

2. In a device of the class described a drawhead, a locking knuckle integral therewith, rotatable locking means within said drawhead, and bushings rotatably mounted in said drawhead, and eccentrically supporting said locking means to permit adjustment of said locking means to take up for wear.

3. In a device of the class described a drawhead, a locking knuckle associated therewith, a rotatable bushing in the upper and lower walls of said drawhead, a recessed cam block eccentrically mounted in each of said bushings, and means adjusting and locking said bushings in adjusted position to take up for wear.

4. In a device of the class described a drawhead, a locking knuckle thereon, an eccentrically mounted adjustable locking cam block rotatable therein, a shoe pivotally mounted on said drawhead to transmit movement to a similar shoe on another of said drawheads when in coupled relation to uncouple the same, and means connected to said locking cam block and shoes to cause a simultaneous movement thereof to unlock and separate the drawheads in uncoupling.

5. In a coupler of the class described drawheads, locking knuckles associated therewith, eccentrically mounted rotatable locking means mounted in said drawheads and mechanism connected to said drawheads and operatable simultaneously with said locking means to cause an unlocking and parting of the drawheads.

6. In a coupler of the class described drawheads, locking knuckles associated therewith, locking means eccentrically and rotatably mounted in said drawheads, means associated with said drawheads and movable with said locking means to cause an unlocking and parting of the drawheads when one of the locking means is retracted into unlocking position, and handles connected at the rear of said drawheads, and connected to said locking means to permit manual operation thereof.

7. In a device of the class described a drawhead, a locking knuckle forming a part thereof, adjustable bushings in said drawhead, and a locking member rotatable in said bushings and adjustable therewith to take up for wear.

8. In a device of the class described a drawhead, a locking knuckle associated therewith, rotatable bushings mounted co-axially in the upper and lower walls of said drawhead, a recessed cam block journaled in said bushings, and mechanism for adjusting said bushings to take up for wear upon the cam block.

9. In a device of the class described a drawhead, a locking knuckle thereon, an adjustable locking cam block rotatable therein, a shoe pivotally mounted on said drawhead to transmit movement to a similar shoe on another of said drawheads when in coupled relation to cause uncoupling of the drawheads, and means connected to said locking cam block and said shoes to cause simultaneous movement thereof to unlock the drawheads in uncoupling.

10. In a device of the class described a drawhead, a locking knuckle thereon, locking means in said drawhead co-acting with said knuckle to lock a complemental knuckle inserted into the drawhead interlocked with said first mentioned knuckle, and means on the drawhead connected with said locking means in the drawhead acting by contact with a similar element on another drawhead to operate similar locking means on the other drawhead to unlock the locking knuckles from the respective drawheads in an uncoupling operation.

11. A coupler of the class described comprising similarly constructed complemental drawheads, locking means in each thereof, and mechanisms on said drawheads co-acting with one another when said drawheads are coupled to cause unlocking of said locking means in both of said drawheads when one of said locking means is operated into unlocking position 12. In a coupler of the class described drawheads, locking means eccentrically and rotatably mounted in said drawheads, means on each of said drawheads adapted to contact one another when said drawheads are coupled and each movable with the respective locking means in its drawhead to cause simultaneous unlocking of the respective locking means in said drawheads when one of the locking means is moved into an unlocking position, and mechanisms for operating said locking means on said drawheads from the exterior of the drawheads.

13. In a coupler of the class described drawheads, locking knuckles associated with each thereof, locking means mounted in each of said drawheads and adjustable therein for wear, means associated with said drawheads and movable with said locking means to cause an unlocking of the drawheads for uncoupling when one of said locking means is retracted into an unlocking position, and means on each of said drawheads for manually operating the locking means thereof.

14. In a coupler of the class described locking knuckles, locking means adjustably and rotatably mounted adjacent said knuckles, means associated and movable with said locking means to cause an unlocking of the coupler when one of said locking means is retracted into an unlocking position, and means for manually operating each of said locking means to unlock the coupler.

In testimony whereof I have hereunto subscribed my name in the presence of two subscribing witnesses.

HERBERT E. VAN DORN.

Witnesses:
FRANK K. HUDSON,
CHARLES W. HILLS, Jr.